United States Patent [19]

Mallett

[11] Patent Number: 4,493,062
[45] Date of Patent: Jan. 8, 1985

[54] RESONANT FREQUENCY MODIFICATION OF PIEZOELECTRIC TRANSDUCERS

[75] Inventor: A. J. Mallett, Houston, Tex.

[73] Assignee: Halliburton Company, Duncan, Okla.

[21] Appl. No.: 560,673

[22] Filed: Dec. 12, 1983

[51] Int. Cl.³ .............................................. G01V 1/40
[52] U.S. Cl. ..................................... 367/32; 181/106; 367/162
[58] Field of Search .......................... 367/32, 35, 912; 181/106, 401; 310/334, 337; 73/579

[56] References Cited

U.S. PATENT DOCUMENTS

| | | | |
|---|---|---|---|
| 3,464,513 | 9/1969 | Raever | 367/35 |
| 3,878,502 | 4/1975 | Rochelle | 367/134 |
| 3,879,702 | 4/1975 | Mancane | 367/139 |
| 3,980,905 | 9/1976 | Miller | 310/317 |
| 3,980,906 | 9/1976 | Kuris et al. | 310/328 |
| 3,982,425 | 9/1976 | McLain | 367/137 |
| 3,992,692 | 11/1976 | Filer | 367/137 |
| 4,006,424 | 2/1977 | Pond | 329/117 |
| 4,012,647 | 3/1977 | Balanuth et al. | 310/317 |
| 4,044,611 | 8/1977 | Kaname et al. | 367/134 |
| 4,353,004 | 10/1982 | Klienschmidt | 310/317 |

FOREIGN PATENT DOCUMENTS 694520  7/1953  United Kingdom ................ 310/317

OTHER PUBLICATIONS

Wendt et al, "Transistorisuter . . . Hydroorting", 1980, pp. 19–20, Radio Fernscher Elektran, vol. 29, #1.

*Primary Examiner*—Nelson Moskowitz
*Attorney, Agent, or Firm*—W. J. Beard

[57] ABSTRACT

For use with an acoustic transmitter in an acoustic well logging tool, an improved transducer modification circuit is set forth in the preferred and illustrated embodiment. The circuit of this disclosure modifies the diameter resonant frequency of a piezoelectric transducer, thereby expanding the frequency range downward for the transmitter transducer by moving the diameter resonant frequency.

3 Claims, 4 Drawing Figures

RESONANT FREQUENCY MODIFICATION OF PIEZOELECTRIC TRANSDUCERS

BACKGROUND OF THE DISCLOSURE

An acoustic well logging tool transmits acoustic pulses into the adjacent formations to obtain logs of various formation properties such as travel time and attenuation. Such a logging tool typically must have a frequency passband which is free of mechanical resonant frequency points which could distort the data obtained in the acoustic log. Most devices of this nature utilize cylindrical shell or sleeve-shaped piezoelectric transducers.

Typically, a piezoelectric transmitter transducer is constructed in the form of a hollow right cylinder. Such a cylinder can resonate in several mechanical modes. One resonant frequency is determined by the wall thickness of the cylindrical transducer; that frequency is ordinarily sufficiently high that it poses no resonance problem to the passband. Another resonant frequency is determined by the length of the right cylinder; the length can be adjusted to place the resonant point outside the passband so that minimal interference is created by that resonant point. The resonant frequency determined by the diameter of the transducer can be very near the typical passband desired for an acoustic well logging tool. Changes of diameter cannot be easily obtained; the diameter is constrained by the diameter of the body or housing of the acoustic well logging tool which is in turn limited by the diameter of the borehole in which acoustic data is typically obtained. It is not possible to increase the diameter in most instances.

It is desirable to extend the passband to lower frequency ranges. In open hole well logging, the attenuation is less for low frequency signals. Low frequency transmitted signals comprise an important portion of the data obtained in an acoustic well log.

A piezoelectric crystal has an advantage over a magnetostrictive transducer of equal size. The advantage stretches the acceptable passband for the piezoelectric crystal to lower frequencies. The circuit of this disclosure further lowers the resonant point. It moves the resonant point of the piezoelectric crystal diametric dimension lower, thereby obtaining a reduced diametric resonant frequency point, and inevitably expanding the acceptable frequency range of the transducer.

The present apparatus incorporates a switching circuit which is selectively connected across the input terminals of the piezoelectric crystal. The switching circuit is selectively switched to enable selective charging of a charging circuit wherein charge interchange occurs between a storage capacitor (in actuality, the crystal) and an inductor to initiate ringing. This interchange changes the shape of the charging curve for the circuit, and thereby changes the resonant frequency to a lower resonant frequency.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
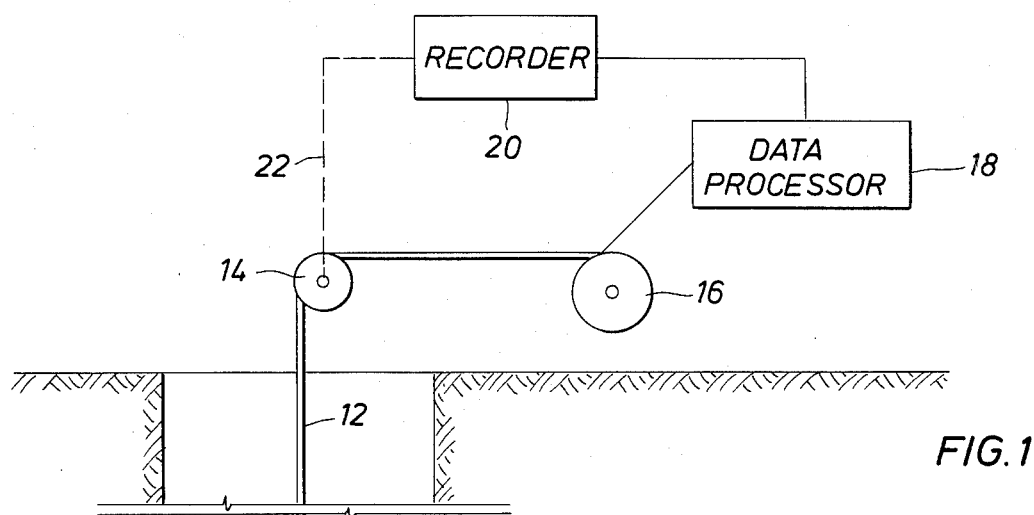
FIG. 1 shows an acoustic well logging tool suspended in a borehole wherein the acoustic piezoelectric transducer crystal is shown.

Attention is first directed to FIG. 1 of the drawings where an acoustic logging tool 10 is lowered in a borehole to obtain an acoustic log. The borehole may be an open hole or cased hole. The sonde 10 is supported by an armored well logging cable 12. This cable passes over a sheave 14 at the well head. The logging cable 12 is several thousand feet long and is spooled onto a drum or reel 16. Signals which are conducted from the sonde 10 are output by conductors of the logging cable 12 to a data processor 18. The processor 18 is connected to a data recorder 20. A mechanical or electronic depth measuring apparatus 22 is connected to the sheave 14 and inputs the depth of the sonde 10 to the recorder 20. This enables data to be recorded as a function of depth in the borehole.

In the sonde, an acoustic transmitter system is included. This comprises a transmitter driving circuit 24. The transmitter 24 is output to a crystal loading circuit 26. In turn, that is connected to a piezoelectric crystal transmitter 28.

The crystal 28 has three dimensions which specify three resonant frequencies. Two of the dimensions are not important to this disclosure; they are the thickness of the crystal and the height of the crystal. This disclosure is concerned more particularly with the diameter of the crystal. As will be observed, the diameter of the crystal is constrained by the diameter of the logging tool 10. The crystal cannot be larger than the logging tool diameter. In fact, it must be smaller so that it can be mounted within the confines of the housing of the logging tool. It will be appreciated that the tool is used in down hole locations exposed to extremes of pressure. Accordingly, the sonde housing containing the crystal must be pressure balanced. Moreover, the logging tool is typically quite small in diameter, typically less than $3\frac{5}{8}$ inches, thereby limiting the crystal to a maximum practical diameter of about two inches. Since the diameter cannot be easily changed to shift the resonant frequency, a loading circuit is connected to the crystal to vary the frequency.

Figure 2:
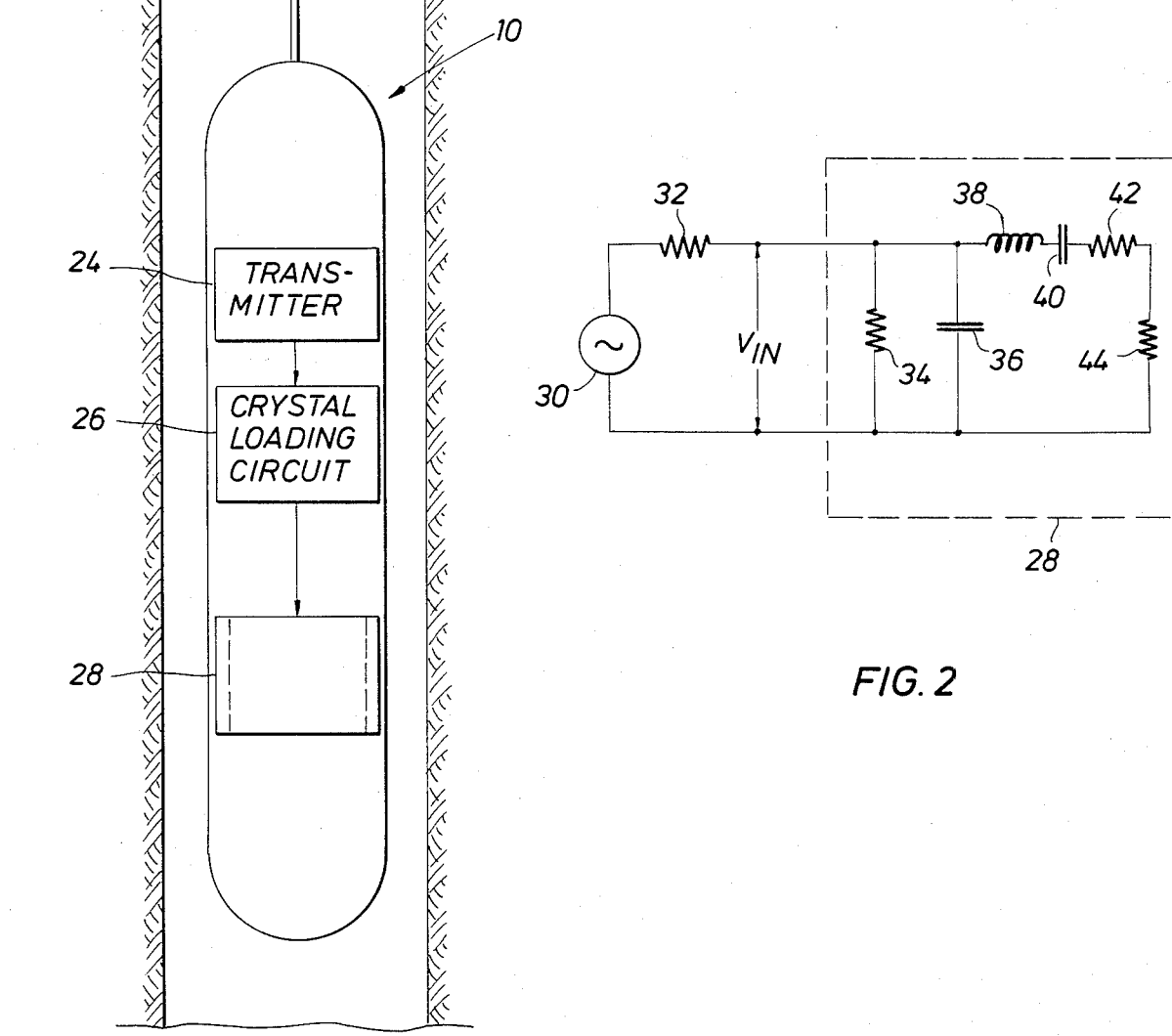
FIG. 2 shows an equivalent circuit utilizing lumped constants for the piezoelectric transducer located in the logging tool of FIG. 1.

Attention is next directed to FIG. 2 of the drawings. There, an equivalent circuit for the crystal 28 is illustrated. The crystal 28 is represented by lumped constants in the equivalent circuit as illustrated in FIG. 2. The crystal is driven by an equivalent generator 30 having a generator resistor 32 in series. This provides an input voltage to the crystal. A resistor 34 represents the loss arising in the dielectric material of the crystal. A capacitor 36 is in parallel with the resistor 34, and represents the clamped capacitance of the piezoelectric crystal. A series inductor 38 represents the mass of the crystal to be vibrated. A series capacitor 40 is the lumped equivalent to the mechanical stiffness of the crystal. A series resistor 42 represents the mechanical losses which occur in the crystal. A load resistor 44 represents the acoustic load on the crystal 28. The acoustic load is represented as a resistor only, and does not have an inductive or capacitive component.

Assume that the voltage generator 30 is swept between between specified frequency limits. If so, resonant and anti-resonant frequency points will be observed. The resonant frequency $F_r$ is determined by the impedance match between the inductor 38 and the capacitor 40. At resonant frequency, a resistive load is reflected to the input terminals for the crystal and maximum power output to the load resistor 44 is accomplished.

In addition to the resonant frequency, an anti-resonant frequency is also established, that being given by the equation:

$$X_{36} = X_{38} - X_{40}$$

Inevitably, the anti-resonant frequency is larger than the resonant frequency. The circuit components added in FIG. 3 lower the resonant frequency of the combined circuit below the resonant frequency $F_r$ defined above.

Figure 3:
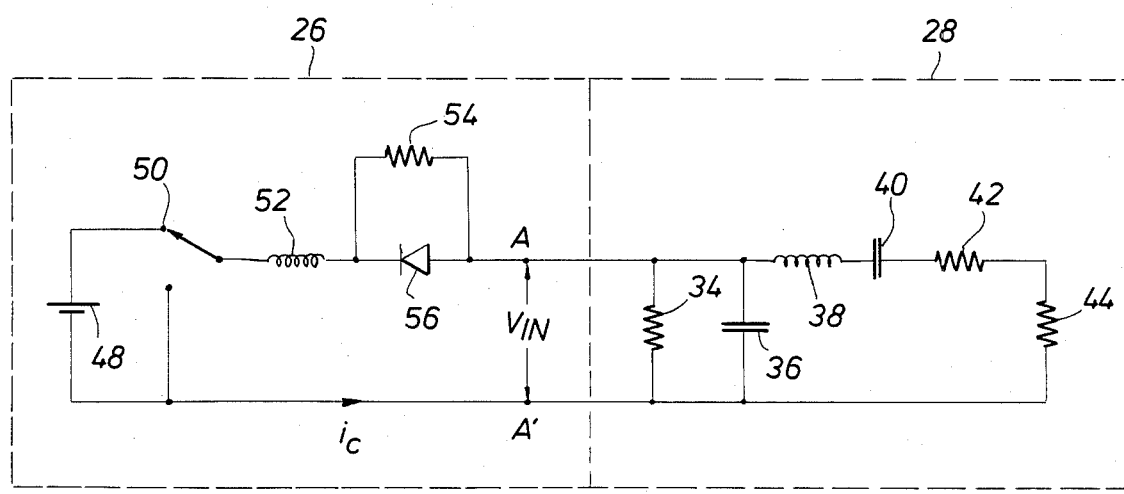
FIG. 3 shows the circuit of FIG. 2 and incorporates the crystal loading circuit of the present invention.

Attention is directed to FIG. 3 of the drawings. FIG. 3 again shows the lumped constant equivalents comprising the transducer 28. In FIG. 3, a suitable voltage supply 48 is input to a switch 50. There is a series inductor 52. The inductor 52 preferably has a very small resistive component compared to a resistor 54. Preferably, an order of magnitude difference will suffice. A series diode 56 is also included. The diode 56 is parallel to the resistor 54. In relative magnitudes, the time constant of the resistor 54 and the capacitor 36 must be large compared to the time $t_2$ defined hereinbelow.

Figure 4:
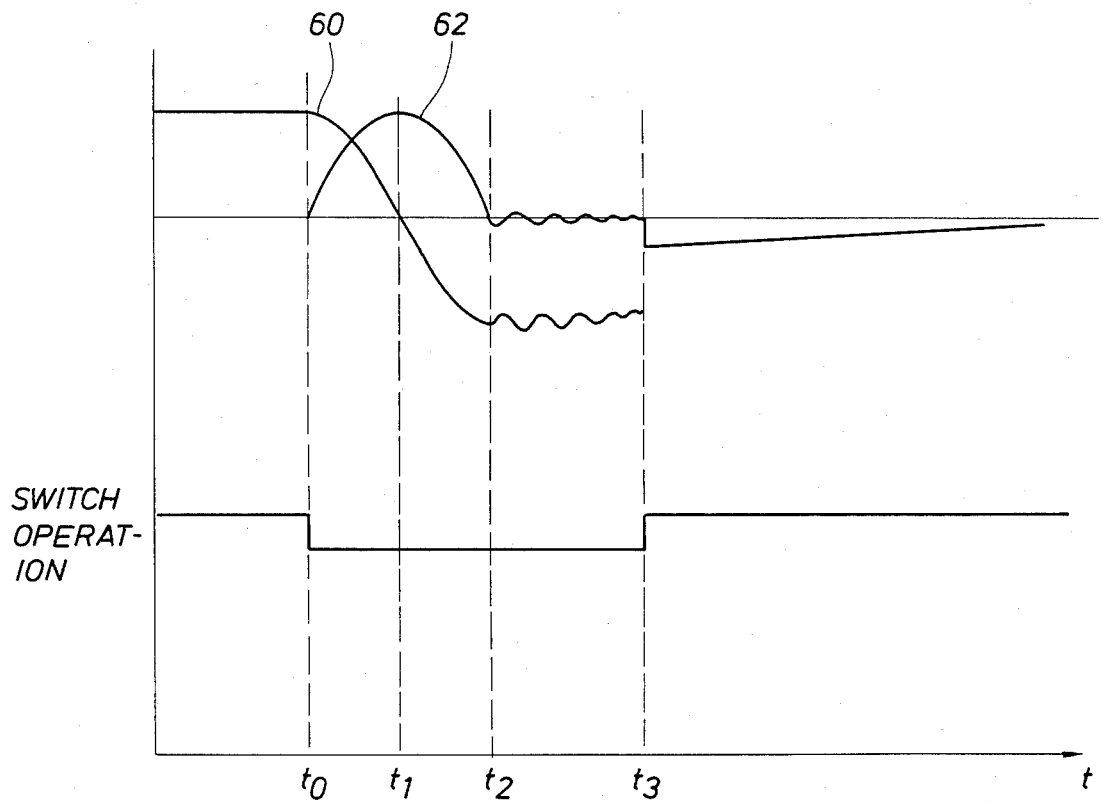
FIG. 4 is a plot as a function of time of the operation of the switch shown in FIG. 3 and includes current and voltage response of the crystal with the crystal loading circuit.

Better understanding of the operation of the crystal loading circuit 26 can be obtained on review of the voltage wave forms shown in FIG. 4. In FIG. 4, the switch 50 is assumed to be in contact with the terminal whereby charging from the voltage source 48 occurs. A steady state condition is assumed wherein charging voltage transients have ended. At a time identified as $t_0$, the switch 50 is opened to disconnect the voltage source. The switch 50 is then grounded, thereby placing the inductor 52 in a tank circuit with the capacitance 36. At the time $t_0$, the voltage input to the crystal 28 is at the peak value identified at 60 in FIG. 4. This voltage is defined by the supply 48. The input voltage begins to drop as a function of the time constant determined by the components 36 and 52. This is indicative of current flow through the crystal 28. At some later time $t_1$, the crystal voltage is zero. This is the time $t_1$ shown in FIG. 4. When this occurs, the current is maximum. When the current is maximum, the dynamic inductive field of the choke 52 is maximum. When the peak current occurs, the magnetic field of the inductor 52 begins collapsing, this being shown by the shape of the curve 62 in FIG. 4. Recall that voltage crossover occurs at the time $t_1$. Recall that the current of the tank circuit has the large peak at 62 and then drops. As the current approaches the completion of the first peak, the current attempts to flow in the opposite direction but cannot because the diode blocks such reverse current flow. This defines the time $t_2$. Diode blocking is evidenced by the fact that the negative current component is quite small, that being determined by the resistor 54. The resistor 54 is relatively large and hence permits only a small current. After a few oscillations, becoming ever smaller and smaller, the current flow reduces substantially to zero. The voltage input to the crystal 28 decays from a negative value toward zero as shown in FIG. 4.

At the time $t_3$, the switch 50 is again operated to initiate the next cycle wherein the voltage 48 is applied to the crystal loading circuit 26.

As will be observed in the cycle from $t_0$ to $t_3$, energy is stored in the capacitor 36 and the inductor 52 and they operate together as a tank circuit, there being an oscillatory energy transfer between these two tank circuit components.

There is a simulated change in crystal diameter. This change depends in part on the voltage applied to the crystal via the input terminals for the crystal in FIG. 3. The change in effective frequency and hence equivalent diameter arises from the current 62 through the crystal 28. The duration of the ringing (the interval between $t_0$ and $t_2$) is determined by the size of the equivalent crystal capacitor 36 and the inductor 38, and the added inductor 52. The relative inductance of the inductor 52 permits control to be established over the resonant frequency. In other words, the effective resonant frequency is reduced by the imposition of the inductor 52 in the tank circuit including the equivalent capacitance 36.

The device can be used repetitively. It is particularly useful in forming repetitive short transmitter bursts. Such transmitter bursts are able to drive the transducer to propagate the customary acoustic transmitted signals into adjacent formations for obtaining acoustic logging information. This is accomplished using the piezoelectric crystal which has a modified resonant frequency. Rather than the resonant frequency being determined primarily by the crystal diameter it is made dependent on the added inductor 52 shown in FIG. 3 and hence, the resonant frequency can be lowered by incorporating a larger inductor.

With the foregoing in view, the present apparatus is thus defined as a crystal loading circuit comprising a voltage source, switch, diode and inductor of size selected to modify the resonant frequency point; this yields a wider frequency range for operation of the acoustic logging tool.

While the foregoing is directed to the preferred embodiment, the scope is determined by the claims which follow.

What is claimed is:

1. An acoustic well tool incorporating a piezoelectric transmitter crystal having a diameter mode resonant frequency said transmitter being operated in a pulsed mode at an output frequency of operation below said diameter mode resonant frequency of said crystal, comprising:
    (a) a piezoelectric crystal for generating acoustic pulses for propagation into the earth formations adjacent to a borehole; and
    (b) a crystal loading circuit connected to said crystal and including a series inductor means, a series blocking diode connected to permit current flow in one direction through said inductor means and said crystal and to limit current flow in the other direction, and wherein said inductor means is connected to a voltage source, and switch means timed in operation to selectively connect said inductor means with said crystal to define a tank circuit having a capacitive component attributable to said crystal and an inductive component from said inductor means wherein the resonant frequency of the tank circuit is less than said diameter resonant frequency of the crystal and to disconnect said inductor means from said voltage source.

2. The apparatus of claim 1 wherein said voltage source includes a DC source connected through said switch means to provide as input a step voltage to said inductor means.

3. The apparatus of claim 2 including a resistor parallel to said diode.

* * * * *